US009585146B2

(12) United States Patent
Lee et al.

(10) Patent No.: US 9,585,146 B2
(45) Date of Patent: Feb. 28, 2017

(54) METHOD OF ALLOCATING SLOT AND ACCESSING CHANNEL IN WIRELESS LOCAL AREA NETWORK (WLAN)

(71) Applicant: Electronics and Telecommunications Research Institute, Daejeon (KR)

(72) Inventors: Joon Soo Lee, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 106 days.

(21) Appl. No.: 14/592,642

(22) Filed: Jan. 8, 2015

(65) Prior Publication Data

US 2015/0201414 A1 Jul. 16, 2015

(30) Foreign Application Priority Data

Jan. 10, 2014 (KR) ........................ 10-2014-0003538

(51) Int. Cl.
*H04W 72/04* (2009.01)
*H04W 74/00* (2009.01)
*H04W 76/02* (2009.01)
*H04W 74/04* (2009.01)
*H04W 74/08* (2009.01)

(52) U.S. Cl.
CPC ..... *H04W 72/0446* (2013.01); *H04W 74/002* (2013.01); *H04W 74/04* (2013.01); *H04W 76/021* (2013.01); *H04W 74/0825* (2013.01)

(58) Field of Classification Search
CPC ..... H04L 5/0058; H04L 5/0053; H04L 47/70; H04L 47/78; H04L 47/828; H04W 72/0446; H04W 74/002; H04W 76/021; H04W 72/048; H04W 72/04
See application file for complete search history.

(56) References Cited

U.S. PATENT DOCUMENTS

| | | | | |
|---|---|---|---|---|
| 2008/0247376 A1* | 10/2008 | Del Prado Pavon | . | H04W 48/08 370/345 |
| 2009/0034446 A1* | 2/2009 | Adams | ... | H04W 28/06 370/314 |
| 2010/0067428 A1* | 3/2010 | Cordeiro | ... | H04W 48/08 370/315 |
| 2012/0163347 A1* | 6/2012 | Joo | ... | H04W 72/0446 370/336 |
| 2015/0131547 A1* | 5/2015 | Seok | ... | H04W 74/04 370/329 |
| 2015/0201414 A1* | 7/2015 | Lee | ... | H04W 74/04 370/336 |
| 2015/0365973 A1* | 12/2015 | Choi | ... | H04W 74/0816 370/336 |

FOREIGN PATENT DOCUMENTS

KR 10-2013-0069532 A 6/2013
WO WO 2013/162340 A1 10/2013

* cited by examiner

*Primary Examiner* — Benjamin H Elliott, IV

(57) ABSTRACT

A method of assigning a slot and accessing a channel in a wireless local area network (WLAN) is provided. A station may attempt to access a channel based on a plurality of candidate slots assigned to the station.

15 Claims, 7 Drawing Sheets

METHOD OF ALLOCATING SLOT AND ACCESSING CHANNEL IN WIRELESS LOCAL AREA NETWORK (WLAN)

CROSS-REFERENCE TO RELATED APPLICATION

This application claims the benefit of Korean Patent Application No. 10-2014-0003538, filed on Jan. 10, 2014, in the Korean Intellectual Property Office, the disclosure of which is incorporated herein by reference.

BACKGROUND

1. Field of the Invention

Embodiments relates to a method of controlling an access to a channel in a wireless communication system.

2. Description of the Related Art

A wireless local area network (WLAN) employs a scheme of preoccupying channels by dispersively accessing a channel medium through a distributed coordination function (DCF) or an enhanced distributed channel access (EDCA), and of transmitting a frame. However, as a number of stations in a basic service set (BSS) including an access point (AP) and a plurality of stations increases, a dispersive channel occupation method has a limitation. When a large number of stations may attempt to access channels to occupy limited resources, a collision probability and a transmission wait time may be rapidly increased.

In the Institute of Electrical and Electronics Engineers (IEEE) 802.11ah, connections of up to 8,000 stations need to be supported. It is impossible to assign different time slots to 8,000 stations, respectively. In the IEEE 802.11ah, a set of a plurality of time slots is called a "restricted access window (RAW)," and the RAW may be assigned to a specific station group. A finite number of time slots in the RAW may be assigned to stations of the specific station group, and each of the stations may perform connection only in a time slot assigned to each of the stations.

Because a plurality of stations may be assigned to a single slot, one of the stations may fail to use the slot. When a station to which an earlier slot in the RAW is assigned fails to occupy a medium in the earlier slot, the station may attempt to access a channel in a next slot using a DCF scheme, which may cause an issue of a related art to occur.

In an existing channel access method based on the IEEE 802.11ah, contention resolution may not be appropriately performed when a plurality of stations are assigned to a single RAW. This is because stations failing to occupy channels in a previous slot continue to appear as new contenders in a next slot.

Because a minimum value of a backoff counter of each of stations failing to occupy a channel in a previous slot is highly likely to be maintained, a collision may occur due to transmission of a plurality of stations in a next slot. Due to the collision, a garbage packet may be highly likely to be generated. The garbage packet may not be decoded by an AP or a destination device. Accordingly, a technology for solving the above issue is required.

SUMMARY

According to an aspect of the present invention, there is provided an operating method of a station included in a service set of an access point (AP), the operating method including: receiving a beacon signal from the AP; acquiring at least two candidate slots assigned to the station, based on the beacon signal; selecting a slot from among the at least two candidate slots; and attempting to access a channel in the selected slot.

The acquiring may include calculating each of the at least two candidate slots, based on predetermined bits of a frame check sequence (FCS) of the beacon signal.

The selecting may include randomly selecting a slot from among the at least two candidate slots.

The acquiring may include acquiring a slot set assigned to the station from the beacon signal, extracting a parameter from the beacon signal, the parameter being used to determine the at least two candidate slots, and calculating slot numbers of at least two candidate slots in the slot set using the parameter.

The acquiring may include extracting an identification (ID) assigned to the station from the beacon signal, extracting predetermined bits for each of the at least two candidate slots from an FCS of the beacon signal, and determining each of the at least two candidate slots based on the ID and the predetermined bits.

The acquiring may include extracting, from the beacon signal, an ID assigned to the station, a slot set assigned to the station, a number of slots in the slot set, and an FCS of the beacon signal, calculating a first slot number corresponding to a remainder obtained by dividing a sum of the ID and two least significant bits (LSBs) of the FCS by the number of slots, calculating a second slot number corresponding to a remainder obtained by dividing a sum of the ID and next two LSBs of the FCS by the number of slots, and determining, as candidate slots, a slot corresponding to the first slot number and a slot corresponding to the second slot number among the slots in the slot set.

The acquiring may include acquiring at least two parameters used to determine the at least two candidate slots. The selecting may include selecting a parameter from among the at least two parameters, and determining the slot based on the selected parameter.

The operating method may further include when an access to the channel is determined to fail, reattempting to access the channel based on remaining candidate slots other than the selected slot among the at least two candidate slots.

The remaining candidate slots may occur after the selected slot.

The operating method may further include when it is determined that no candidate slot remains, operating in a low power mode until a next beacon signal is received.

The operating method may further include extracting information associated with a slot set assigned to the station from the beacon signal. The acquiring may include acquiring the at least two candidate slots from among a plurality of slots in the slot set.

The attempting may include attempting to access the channel using a distributed coordination function (DCF) scheme.

According to another aspect of the present invention, there is provided an operating method of an AP, the operating method including: assigning a slot set including a plurality of slots to a group including a plurality of stations; generating a parameter used to determine at least two candidate slots for each of the plurality of stations; and transmitting a beacon signal including the parameter to the plurality of stations.

The parameter may include an FCS of the beacon signal, and each of the plurality of stations may calculate the at least two candidate slots based on predetermined bits in the FCS.

The beacon signal may further include the slot set assigned to the group, and a number of the plurality of slots in the slot set.

Each of the plurality of slots may include a time resource between beacon intervals.

The operating method may further include dividing a time resource between beacon intervals into slots with equal lengths, and grouping the slots into each of a plurality of slot sets.

The operating method may further include grouping, into a plurality of groups, a plurality of stations included in a service set of the AP.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
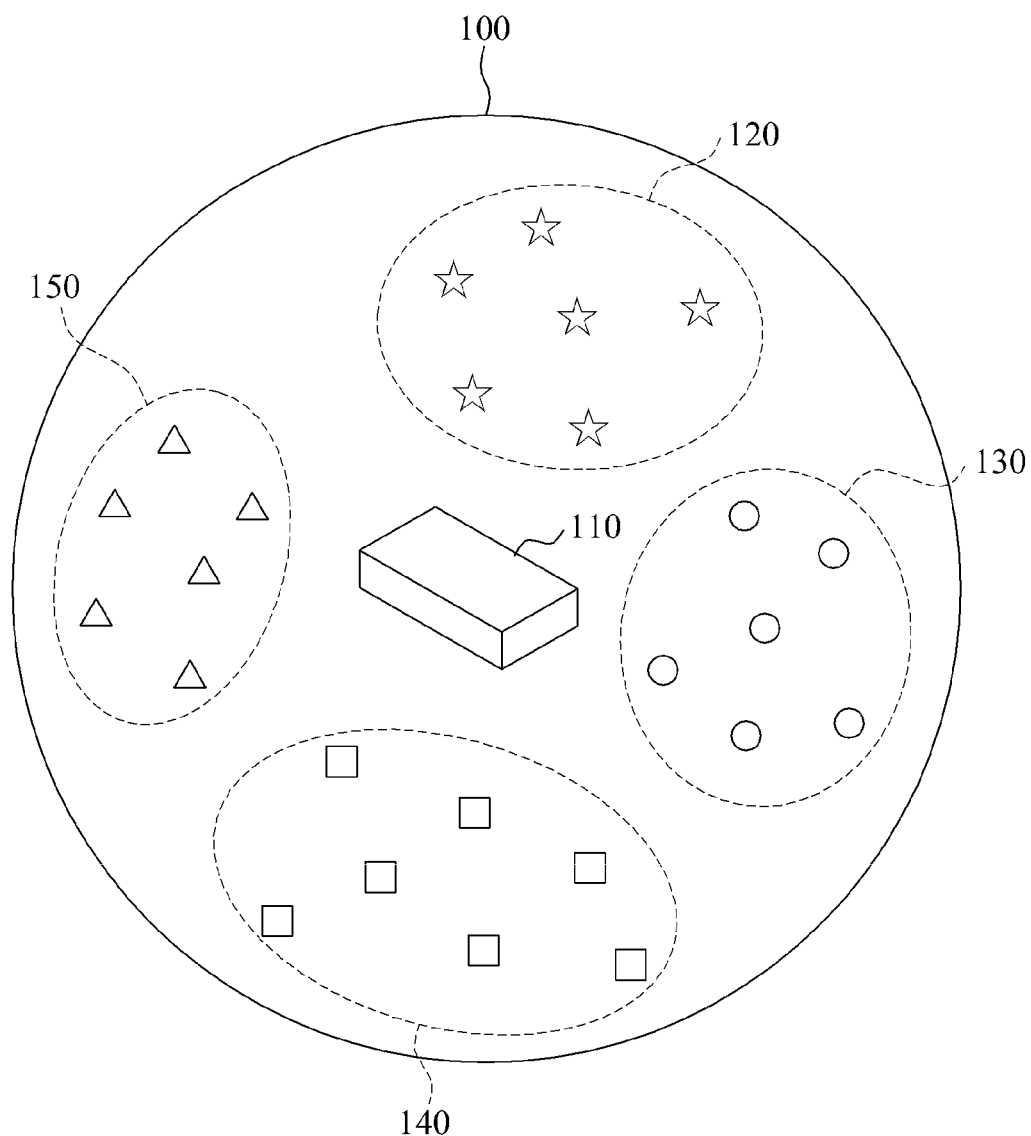
FIG. 1 is a diagram illustrating a basic service set (BSS) of an access point (AP) according to an embodiment.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 illustrates a basic service set (BSS) 100 according to an embodiment. Referring to FIG. 1, the BSS 100 may include an access point (AP) 110, and a plurality of stations. The plurality of stations may be grouped into a plurality of groups, for example, groups 120, 130, 140, and 150.

Each of the groups 120, 130, 140, and 150 may include a plurality of stations, and may hereinafter be referred to as a "station group." Each of the plurality of stations may be serviced by the AP 110. Each of the plurality of stations may include a sensing terminal, a metering terminal, and the like.

Figure 2:
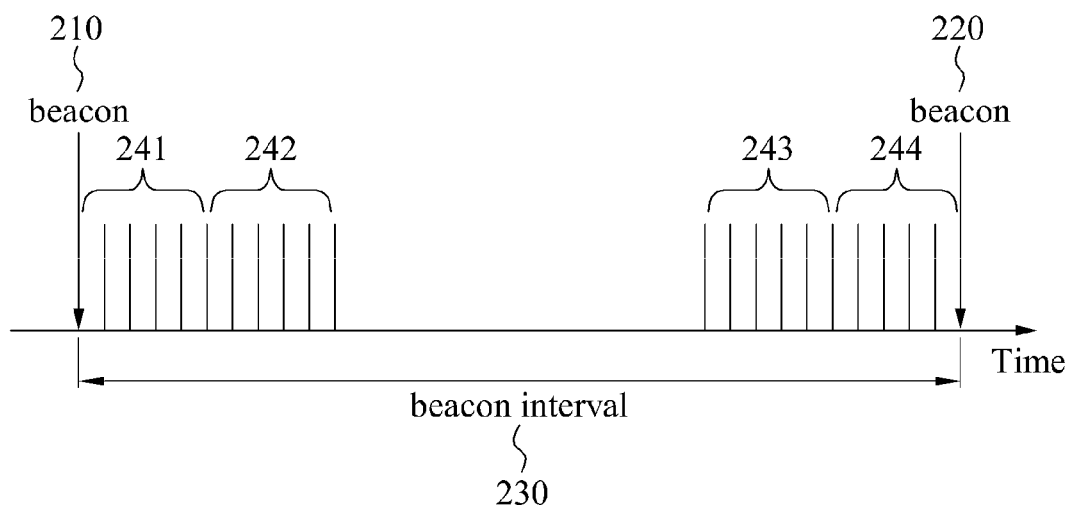
FIG. 2 is a diagram illustrating a slot and a slot set according to an embodiment.

FIG. 2 illustrates a slot, and a slot set according to an embodiment. Referring to FIG. 2, an AP according to an embodiment may regard air occupation as a time domain, and may divide the time domain into a plurality of slots with equal lengths. The AP may assign each of the slots to a station that accesses the AP, or a station group including a plurality of stations. Hereinafter, the slots may be referred to as "time slots."

For example, the AP may transmit assignment information to a station or a station group through a beacon signal. The AP may periodically transmit a beacon signal. The AP may divide a beacon interval 230 between a first beacon signal 210 and a second beacon signal 220 into a plurality of slots. For example, the AP may divide the beacon interval 230 into slots with equal lengths.

The AP may group a plurality of slots into a plurality of slot sets, for example, slot sets 241, 242, 243, and 244. The AP may assign the slot sets 241 to 244 to a plurality of station groups, which will be further described below.

The above slot allocation may allow only a station or a station group permitted by the AP to occupy a channel and accordingly, a collision probability may be reduced by preventing an unpermitted station from occupying a channel. Additionally, a plurality of stations may transition to a dose state in a time that is not assigned to the stations and accordingly, energy may be saved.

Embodiments may be applied to the Institute of Electrical and Electronics Engineers (IEEE) 802.11ah. The IEEE 802.11ah refers to a standard that supports a large number of stations, for example, a sensor, a metering terminal, and the like, in sub 1 gigahertz (GHz) bands.

In the IEEE 802.11ah, connections of up to 8,000 stations need to be supported. It is impossible to assign different time slots to 8,000 stations, respectively. In the IEEE 802.11ah, a set of a plurality of time slots is called a "restricted access window (RAW)," and the RAW may be assigned to a specific station group. A finite number of time slots in the RAW may be assigned to stations in the specific station group, and the stations may perform connection only in a time slot assigned to each of the stations.

Each of stations may verify a time slot assigned to each of the stations, based on a traffic indication map (TIM) information element (IE), information in a RAW parameter set (RPS) IE, and the like. The TIM IE and the RPS IE may be included in a beacon signal that is periodically transmitted by an AP. For fairness between stations, time slots may be randomly assigned to the stations, and the same slot may be assigned to a plurality of stations, because a number of stations in a group may be greater than a finite number of slots.

For example, a plurality of stations may be assigned to a single slot and accordingly, the stations may access channels using a distributed coordination function (DCF) scheme. In this example, one of the stations may fail to use the slot. Additionally, based on the IEEE 802.11ah, when a station to which an earlier slot in a RAW is assigned fails to occupy a medium in the earlier slot, the station may attempt to access a channel in a consecutive next slot using the DCF scheme.

In this example, an issue of a related art may occur. In an existing channel access method based on the IEEE 802.11ah, contention resolution may not be appropriately performed when a plurality of stations are assigned to a single RAW. This is because stations failing to occupy channels in a previous slot continue to appear as new contenders in a next slot, as described above.

Because a minimum value of a backoff counter of each of stations failing to occupy a channel in a previous slot is highly likely to be maintained, a collision may occur due to transmission of a plurality of stations in a next slot. Due to the collision, a garbage packet may be highly likely to be generated. The garbage packet may not be decoded by an AP.

Additionally, a station failing to occupy a channel in a previous slot over a slot boundary may access the channel in a next slot. Accordingly, a plurality of stations may be highly likely to perform contention to a single slot. For example, when a station failing to occupy a channel in a previous slot over a slot boundary attempts to access the channel in a next slot, a considerable large number of stations may attempt to access channels in a later slot in a RAW.

Figure 3:
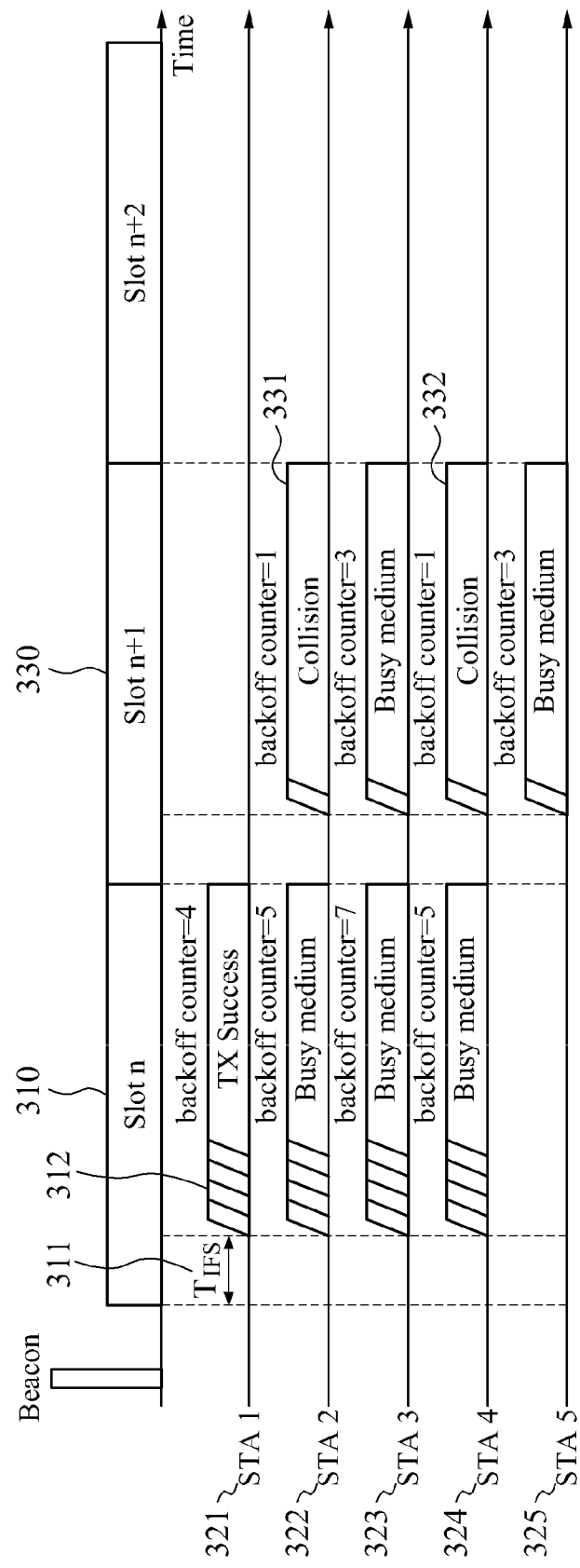
FIG. 3 is a diagram illustrating a scenario of a performance degradation due to a collision according to an embodiment.

FIG. 3 illustrates a scenario of a performance degradation due to a collision according to an embodiment. Referring to FIG. 3, a plurality of stations, for example a first station 321, a second station 322, a third station 323, and a fourth station 324, may be assigned to a single slot 310 in a RAW. For conceptual description, description is given in view of a backoff, and a process, for example a DATA, an ACK, and the like is omitted.

A backoff counter of the first station 321 may be "4," a backoff counter of the second station 322 may be "5," a backoff counter of the third station 323 may be "7," and a backoff counter of the fourth station 324 may be "5." Among the first stations 321 to the fourth station 324, the backoff counter of the first station 321 may have a minimum value. The first station 321 may occupy a channel after a time corresponding to an inter frame space (IFS) 311 and a backoff 312.

The other stations may reduce the backoff counters by a backoff time of the first station 321. For example, the backoff counter of the second station 322 may be reduced to "1," the backoff counter of the third station 323 may be reduced to "3," and the backoff counter of the fourth station 324 may be reduced to "1."

For example, when a next slot 330 is idle, a fifth station 325 assigned to the next slot 330, in addition to the second station 322 to the fourth station 324 failing to occupy channels in the slot 310, may perform a backoff procedure to occupy a channel. In this example, the second station 322 and the fourth station 324 having the same backoff counter may simultaneously attempt to occupy a channel. Accordingly, collisions 331 and 332 may occur, and the next slot 330 may not be substantially used, which may cause a performance degradation.

As described above, in a RAW slot allocation method proposed by the IEEE 802.11ah, because a single AP needs to service at least thousands of stations, the above-described collision scenario may be naturally generated. Stations that fail to previously perform transmission may be assigned to later slots in a RAW, rather than earlier slots, and a large number of stations, each having a backoff counter set to expire, may be assigned to a later slot in a RAW and accordingly, a collision may continue to occur.

In comparison to the existing IEEE 802.11ah, embodiments may provide a technology for enhancing a whole performance of a wireless local area network (WLAN) by reducing in a collision probability, and for reducing power consumption in a WLAN system with a power limitation.

Embodiments may be applicable to a WLAN system using a slot access, in addition to a WLAN system and the IEEE 802.11ah. However, for convenience of description, embodiments applied to the IEEE 802.11ah will be described below. Hereinafter, in a WLAN system according to an embodiment, an AP may notify each station of information on a slot and a slot set (for example, a RAW in the IEEE 802.11ah), and each station may operate in a protocol that allows each station to know a slot in which each station is to perform an access, based on the information.

As described above, embodiments may provide a method and a protocol for providing additional information to allow each station to make a little more advanced decision when an AP notifies each station of information on a slot and a slot set.

Figure 4:
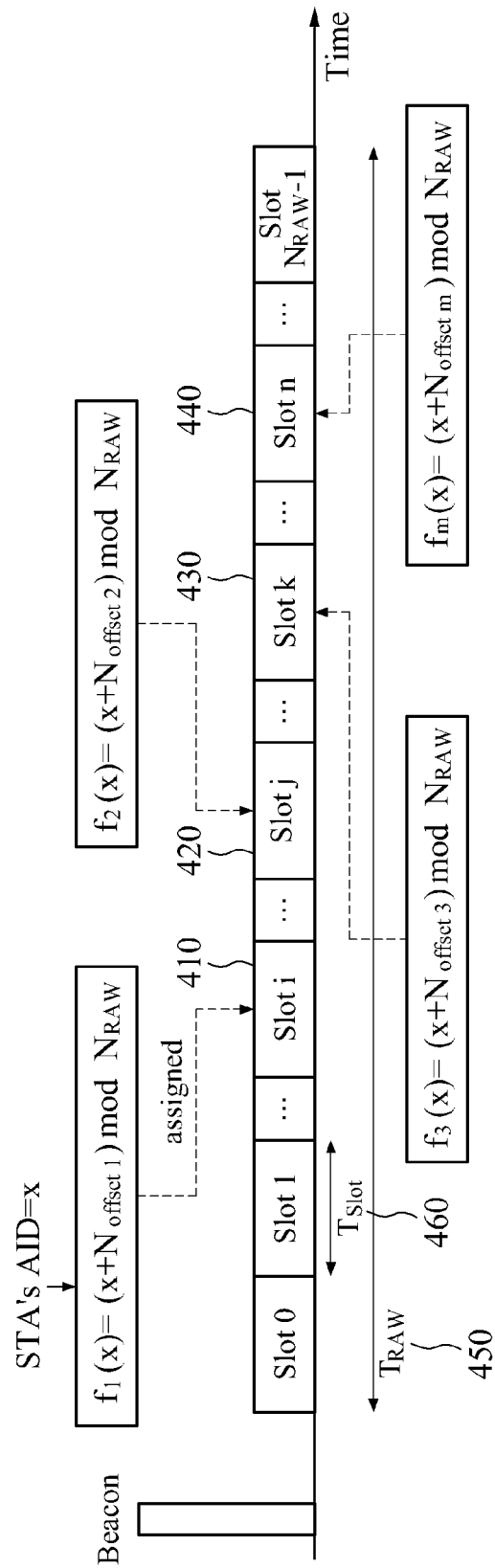
FIG. 4 is a diagram illustrating a method of acquiring at least two candidate slots according to an embodiment.

FIG. 4 illustrates a method of acquiring at least two candidate slots according to an embodiment. Referring to FIG. 4, a station according to an embodiment may acquire a plurality of candidate slots based on information included in a beacon signal. The station may randomly select a single slot from among the candidate slots, and may attempt to access a channel in the selected slot. For example, the station may verify information of Table 1 based on a TIM IE and/or an RPS IE included in the beacon signal.

TABLE 1 x: Association ID (AID) of individual STA
$N_{RAW}$: Number of slots in a RAW
$f_1(x)$: Slot number of a first candidate slot 410 assigned to AID x
$f_2(x)$: Slot number of a second candidate slot 420 assigned to AID x
$f_3(x)$: Slot number of a third candidate slot 430 assigned to AID x
$f_m(x)$: Slot number of an m-th candidate slot 440 assigned to AID x
(m ≤ N_RAW)
$N_{offset, 1}$: Two least significant bits (LSBs) of a frame check sequence (FCS) of a beacon
$N_{offset, 2}$: Next two LSBs of an FCS of a beacon
$N_{offset, 3} \sim N_{offset, m}$: Next two LSBs of an FCS of a beacon
$T_{RAW}$: RAW duration 450
$T_{slot}$: Slot duration 460

An AP may assign a plurality of slots to individual stations, and a station may be aware of a slot in which the station is to perform an access, based on the above-described information. However, because a concept of the "assigning" is a value recognized by the station, the station may perceive a slot in which the station has a right to perform an access based on the above-described information.

For example, the AP may calculate a slot number of an m-th candidate slot, using Equation 1 shown below. In Equation 1, m may be a positive integer that is greater than "1" and equal to or less than $N_{RAW}$.

$$f_m(x) = (x + N_{offset,m}) \bmod N_{RAW} \qquad \text{[Equation 1]}$$

The station may randomly select one of a plurality of candidate slots. For example, when a candidate slot with a lowest slot number is set as a slot in which an access is to be performed, a large number of stations may be likely to be assigned to an earlier slot. Accordingly, a plurality of stations may be prevented from being assigned to a specific slot (for example, an earlier slot) by randomly selecting a slot in which an access is to be performed.

According to an embodiment, a station may randomly select a single parameter from among a plurality of parameters used to determine a plurality of candidate slots, instead of calculating all slot numbers of the plurality of candidate slots. The station may calculate a slot number of a candidate slot using the selected parameter, and may attempt to access a channel based on the candidate slot.

Additionally, a number of candidate slots may be variously set, with an upper limit of $N_{RAW}$ candidate slots. For example, two or three candidate slots may be set based on a policy of an AP. The number of candidate slots may be updated through a management procedure of the AP.

For example, when five candidate slots are included in a station, the station may randomly select a single candidate slot from among the five candidate slots. When the selected candidate slot has a third largest slot number, the station may have two opportunities to access a channel, in addition to the selected candidate slot. When an access to a channel in the selected candidate slot with the third largest slot number fails, the station may reattempt to access the channel in a candidate slot with a fourth largest slot number. When an access to the channel in the candidate slot with the fourth largest slot number also fails, the station may reattempt to access the channel in a candidate slot with a fifth largest slot number.

When a candidate slot in which the access to the channel is to be attempted does not remain, the station may operate in a low power mode.

In embodiments, when an attempt to access a channel fails, a plurality of candidate slots may be set, instead of the access to the channel being reattempted in a next slot and accordingly, a probability of a collision in a slot of a RAW may be reduced. Therefore, it is possible to prevent stations failing to occupy the channel from continuously attempting to occupy the channel in a next slot.

Additionally, in the existing IEEE 802.11ah, a station may be likely to remain awake until a channel is preoccupied. In the worst case, stations failing to occupy a channel may remain awake in an entire RAW. In this case, power may be wasted. In embodiments, a number of times a channel occupation is attempted may be limited due to a limited access and accordingly, it is possible to reduce power consumption of stations.

Additionally, in the existing IEEE 802.11ah, a station may attempt an unscheduled access. The station may attempt the unscheduled access in a slot that is not included in a RAW, while ignoring a beacon. A transmission attempt of the station attempting the unscheduled access may be against a rule of a RAW/slot and accordingly, a collision probability may be increased. In embodiments, when an access attempt fails, an access may be attempted in a corresponding candidate slot, by setting a plurality of candidate slots, instead of the access being reattempted in a next slot. Accordingly, an access probability of a plurality of stations in a next slot due to transmission of the station attempting the unscheduled access may be reduced. Consequently, a collision probability in a next slot may be reduced.

When all channel access attempts in a plurality of candidate slots in a RAW fail, a station may not attempt to access a channel in the RAW. For example, when all channel access attempts in five candidate slots fail, an AP may manage a state of a corresponding station so that a slot in a next RAW may be assigned to the corresponding station.

When a station failing to occupy a channel continues to be awake, the station may remain as a latent disrupter of another station. Accordingly, when attempts of a predetermined level fail in a single RAW, the attempts may be reperformed in a next RAW, to enhance an efficiency of resources. In other words, when a station fails to acquire a slot resource assigned in advance by an AP, a whole system performance may be enhanced by assigning the slot resource to another station and by acquiring a resource in a next assignment of the AP.

Figure 5:
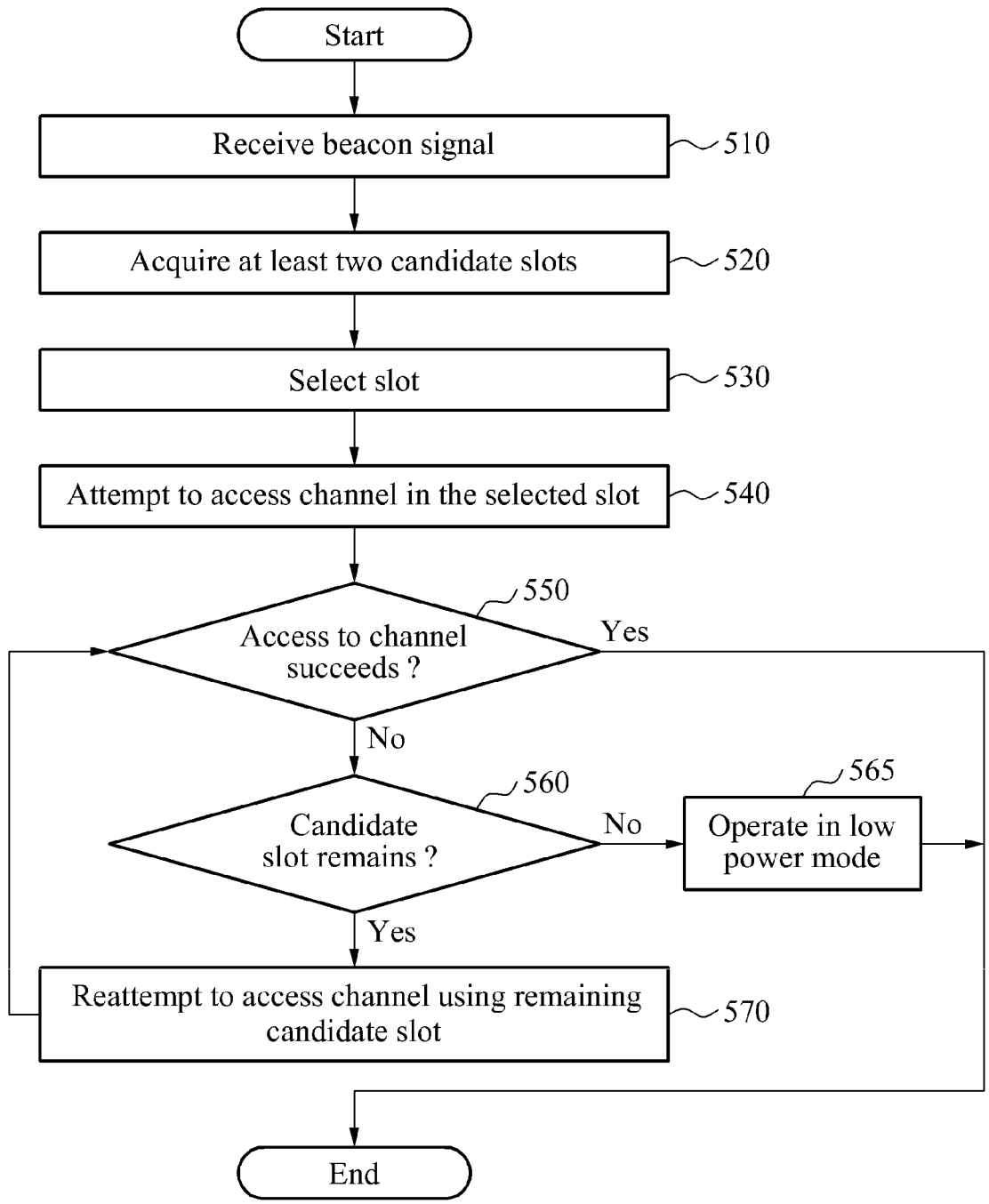
FIG. 5 is a flowchart illustrating an operating method of a station according to an embodiment.

FIG. 5 is a flowchart illustrating an operating method of a station according to an embodiment. Referring to FIG. 5, in operation 510, the station may receive a beacon signal from an AP. In operation 520, the station may acquire at least two candidate slots assigned to the station, based on the beacon signal. In operation 530, the station may select a slot from among the at least two candidate slots. In operation 540, the station may attempt to access a channel in the selected slot.

In operation 550, the station may determine whether an access to the channel succeeds. When the access is determined to fail, the station may determine whether at least one candidate slot remains in operation 560. For example, the station may determine whether a candidate slot subsequent to the selected slot remains.

When it is determined that the at least one candidate slot remains, the station may reattempt to access the channel in operation 570. When it is determined that no candidate slot remains, the station may operate in a low power mode in operation 565. In the low power mode, the station may not attempt to access a channel until a next beacon signal is received.

The above-description of FIGS. 1 through 4 is also applicable to the method of FIG. 5 and accordingly, will not be repeated here.

Figure 6:
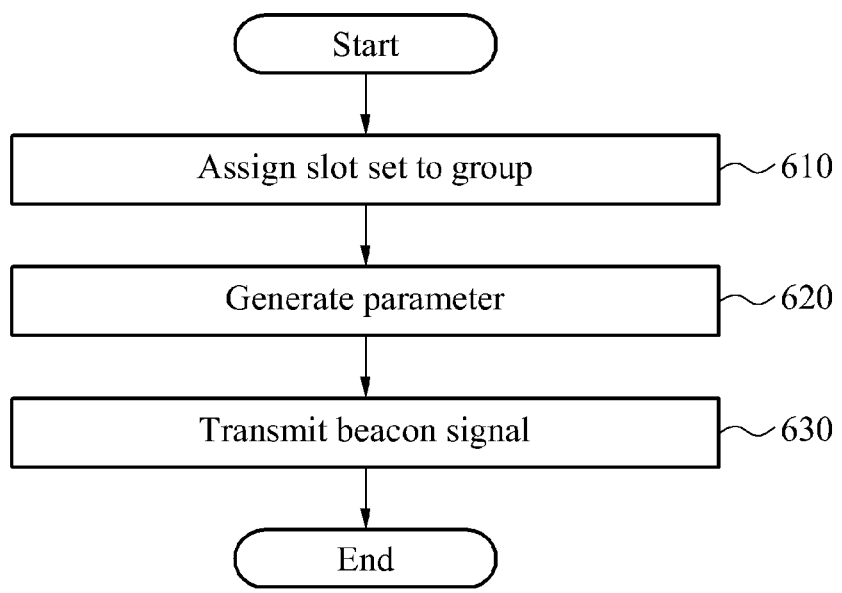
FIG. 6 is a flowchart illustrating an operating method of an AP according to an embodiment.

FIG. 6 is a flowchart illustrating an operating method of an AP according to an embodiment. Referring to FIG. 6, in operation 610, the AP may assign a slot set including a plurality of slots to a group including a plurality of stations. In operation 620, the AP may generate a parameter used to determine at least two candidate slots for each of the plurality of stations. The parameter may include, for example, an FCS of a beacon signal. Each of the plurality of stations may determine at least two candidate slots based on predetermined bits in the FCS of the beacon signal.

In operation 630, the AP may transmit a beacon signal including the parameter to the plurality of stations. The above-description of FIGS. 1 through 4 is also applicable to the method of FIG. 6 and accordingly, will not be repeated here.

Figure 7:
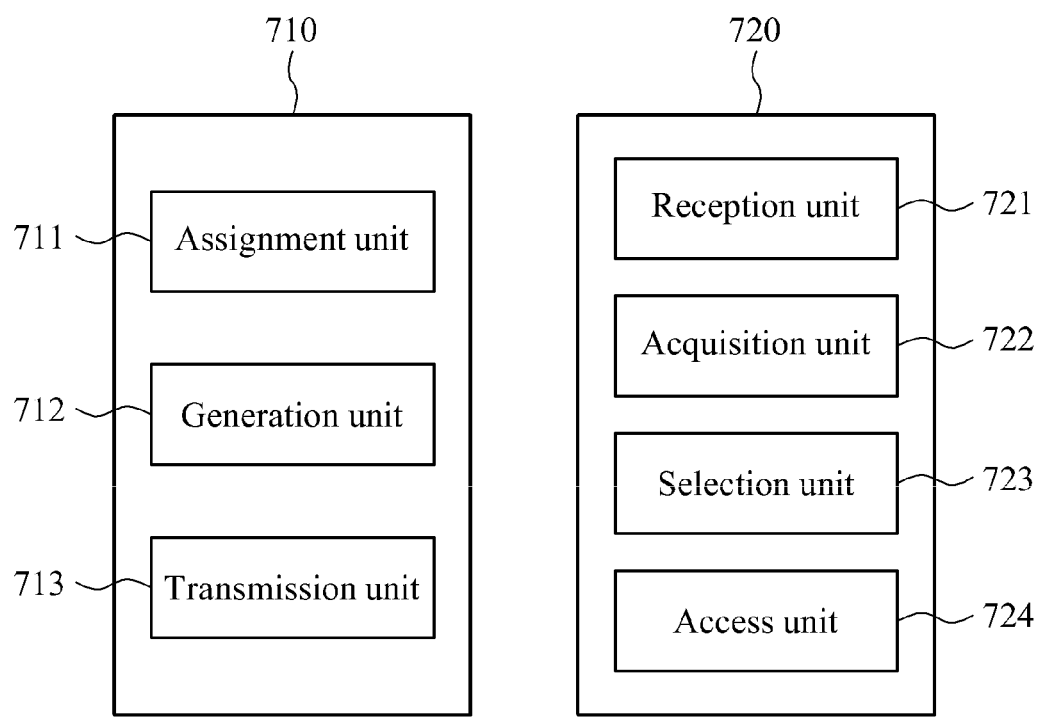
FIG. 7 is a block diagram illustrating an AP and a station according to an embodiment.

FIG. 7 is a block diagram illustrating an AP 710 and a station 720 according to an embodiment. Referring to FIG. 7, the AP 710 may include an assignment unit 711, a generation unit 712, and a transmission unit 713. The assignment unit 711 may assign a slot set including a plurality of slots to a group including a plurality of stations. The generation unit 712 may generate a parameter used to determine at least two candidate slots for each of the plurality of stations. The transmission unit 713 may transmit a beacon signal including the parameter to the plurality of stations.

The station 720 may include a reception unit 721, an acquisition unit 722, a selection unit 723, and an access unit 724. The reception unit 721 may receive a beacon signal from the AP 710. The acquisition unit 722 may acquire at least two candidate slots assigned to the station 720, based on the beacon signal. The selection unit 723 may select a single slot from among the at least two candidate slots. The access unit 724 may attempt to access a channel in the selected slot.

The access unit 724 may determine whether an access to the channel succeeds. When the access is determined to fail, the access unit 724 may determine whether at least one candidate slot remains. When it is determined that the at least one candidate slot remains, the access unit 724 may reattempt to access the channel using the remaining candidate slot. When it is determined that no candidate slot remains, the access unit 724 may not attempt to access a channel until a next beacon signal is received. For example, the station 720 may operate in the low power mode.

The above-description of FIGS. 1 through 6 is also applicable to the AP 710 and the station 720 of FIG. 7 and accordingly, will not be repeated here.

According to embodiments, in a WLAN system, an AP may transmit, to each station, information on a slot and a slot set (for example, a RAW in the IEEE 802.11ah), and each station may perceive a slot in which each station is to perform an access, based on the information. Additionally, the AP may provide additional information to allow each station to efficiently determine use of a slot.

Embodiments may provide a technology for reducing a probability of a collision in a slot. Also, embodiments may provide a technology for reducing power consumption, because a station failing to occupy a channel does not need to remain awake until the channel is preoccupied. Furthermore, embodiments may provide a technology for enhancing stability of a protocol, by complementing breaking of a slot allocation rule due to the advent of a station that attempts an unscheduled access by ignoring a beacon signal. Based on the above technologies according to embodiments, it is possible to enhance a whole system performance, and to reduce power consumption.

According to embodiments, it is possible to enhance a whole performance of a WLAN due to a reduction in a collision probability, and to reduce power consumption in a WLAN system with a power limitation, in comparison to the existing IEEE 802.11ah.

The units described herein may be implemented using hardware components, software components, or a combination thereof. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An operating method of a station included in a service set of an access point (AP), the operating method comprising:
   receiving a beacon signal from the AP;
   acquiring at least two candidate slots assigned to the station, based on the beacon signal;
   selecting a slot from among the at least two candidate slots; and
   attempting to access a channel in the selected slot,
   wherein the acquiring comprises calculating each of the at least two candidate slots, based on predetermined bits of a frame check sequence (FCS) of the beacon signal.

2. The operating method of claim 1, wherein the selecting comprises randomly selecting a slot from among the at least two candidate slots.

3. The operating method of claim 1, wherein the acquiring further comprises:
   extracting an identification (ID) assigned to the station from the beacon signal,
   wherein the ID assigned to the station is used in addition to the predetermined bits of the FCS to calculate each of the at least two candidate slots.

4. The operating method of claim 1, wherein the acquiring further comprises:
   extracting, from the beacon signal, an ID assigned to the station, a slot set assigned to the station, a number of slots in the slot set, and the FCS of the beacon signal;
   calculating a first slot number corresponding to a remainder obtained by dividing a sum of the ID and two least significant bits (LSBs) of the FCS by the number of slots;
   calculating a second slot number corresponding to a remainder obtained by dividing a sum of the ID and next two LSBs of the FCS by the number of slots; and
   determining, as candidate slots, a slot corresponding to the first slot number and a slot corresponding to the second slot number among the slots in the slot set.

5. The operating method of claim 1, further comprising:
   when an access to the channel is determined to fail, reattempting to access the channel based on remaining candidate slots other than the selected slot among the at least two candidate slots.

6. The operating method of claim 5, wherein the remaining candidate slots occur after the selected slot.

7. The operating method of claim 5, further comprising:
   when it is determined that no candidate slot remains, operating in a low power mode until a next beacon signal is received.

8. The operating method of claim 1, further comprising:
   extracting information associated with a slot set assigned to the station from the beacon signal, wherein the acquiring comprises acquiring the at least two candidate slots from among a plurality of slots in the slot set.

9. The operating method of claim 1, wherein the attempting comprises attempting to access the channel using a distributed coordination function (DCF) scheme.

10. An operating method of an access point (AP), the operating method comprising:
assigning a slot set comprising a plurality of slots to a group comprising a plurality of stations;
generating a parameter used to determine at least two candidate slots for each of the plurality of stations; and
transmitting a beacon signal comprising the parameter to the plurality of stations,
wherein the parameter comprises a frame check sequence (FCS) of the beacon signal, and
wherein each of the plurality of stations calculates the at least two candidate slots based on predetermined bits in the FCS.

11. The operating method of claim 10, wherein the beacon signal further comprises the slot set assigned to the group, and a number of the plurality of slots in the slot set.

12. The operating method of claim 10, wherein each of the plurality of slots comprises a time resource between beacon intervals.

13. The operating method of claim 10, further comprising:
dividing a time resource between beacon intervals into slots with equal lengths; and
grouping the slots into a plurality of slot sets.

14. The operating method of claim 10, further comprising:
grouping, into a plurality of groups, a plurality of stations included in a service set of the AP.

15. An operating method of a station included in a service set of an access point (AP), the operating method comprising:
receiving a beacon signal from the AP;
acquiring at least two candidate slots assigned to the station, based on the beacon signal;
selecting a slot from among the at least two candidate slots; and
attempting to access a channel in the selected slot,
wherein the acquiring comprises:
extracting an identification (ID) assigned to the station from the beacon signal;
extracting predetermined bits for each of the at least two candidate slots from an FCS of the beacon signal; and
determining each of the at least two candidate slots based on the ID and the predetermined bits.

* * * * *